United States Patent [19]

Brida

[11] Patent Number: 5,577,707
[45] Date of Patent: Nov. 26, 1996

[54] SLIDE VALVE

[75] Inventor: Hubert Brida, Götzis, Austria

[73] Assignee: VAT Holding AG, Haag, Switzerland

[21] Appl. No.: 573,833

[22] Filed: Dec. 18, 1995

[51] Int. Cl.$^6$ ...................................................... F16K 3/20
[52] U.S. Cl. ................................. 251/159; 251/193
[58] Field of Search .................................. 251/159, 188, 251/193

[56] References Cited

U.S. PATENT DOCUMENTS

| 2,370,751 | 3/1945 | Prayer | 251/159 |
| 3,170,668 | 2/1965 | Aulisa | 251/193 X |
| 5,111,839 | 5/1992 | Schroepfer et al. | 251/159 X |

Primary Examiner—John C. Fox
Attorney, Agent, or Firm—Anderson, Kill, Olick P.C.

[57] ABSTRACT

A slide valve including a housing having a flow channel, a slide plate for controlling flow through the channel, and a seal ring surrounding the flow channel and engaging the slide plate in its closed position and disengageable from the slide plate in its open position, with the seal ring having on its side remote for the slide plate, a plurality of circumferentially arranged recesses spaced from each other, extending in a circumferential direction, outwardly limited by key hole-shaped openings respectively, and aligned, respectively, with the bores formed in the adjacent to the seal ring, annular surface of the housing and in which a plurality of bolts are respectively displaceable, which bolts have shaped heads extending into the recesses and engageable from behind by key hold-shaped openings.

11 Claims, 2 Drawing Sheets

SLIDE VALVE

BACKGROUND OF THE INVENTION

The present invention relates to a slide valve, in particular to a slide valve for use in vacuum apparatuses, and including a housing having a flow channel, a slide plate located in the housing and displaceable transversely to a flow channel axis between a closed position, in which it blocks flow through the flow channel, and an open position, in which it provides for the flow through the flow channel, and a seal ring surrounding the flow channel and engaging the slide plate in its closed position and disengageable from the slide plate in its open position.

The slide valve of the above-described type are well known. A slide valve disclosed in German patent No. 1,264,191 has a seal ring formed of an elastomeric material and located in an annular groove, the height of which measured in an axial direction of the flow channel is larger than the seal ring diameter. A pressure medium is supplied into the annular grove so that, when the slide plate is displaced into its closed position, the pressure medium acts on the seal ring and biases it against the slide plate. In a slide valve of this type, disclosed in a German publication DE-OS 34 47 008, metal bellows are provided on opposite sides of the slide plate, when the slide plate is in its closed position, which bellows carry seal rings on sides thereof adjacent to the slide plate, respectively. These metal bellows, which are arranged in pairs and circumscribe respective flow channels, are subjected to the action of a pressure medium and bias the seal rings against the slide plate when the latter is displaced into its closed position. Inside of the metal bellows, there are provided tension springs which lift the seal rings off the slide plate when the metal bellows are not subjected to fluid pressure. A similar construction is disclosed in U.S. Pat. No. 3,145,969.

Finally, German utility model DE-GM 77 31 993 discloses a slide valve in which the seal ring is formed as an annular piston, displaceable in an annular groove provided in the slide valve housing, and opposite sides of which are subjected to the action of a pressure medium.

All of the described constructions of a slide valve are very expensive and, in addition, their flow channel region is accessible with much difficulties so that the slide valve should be completely disassembled for, e.g., rinsing purposes. And this is possibly only when the slide valve is completely removed from the apparatus in which it is mounted.

The operational processes which take place in vacuum apparatuses, in which such slide valve are generally used, do not permit contamination of the flow region of the slide valve, so that it should be possible to clean, from time to time, the inside of the slide valve, in particular, the parts which are directly used for sealing purposes.

Accordingly, the object of the invention is a slide valve of the above-described type having a construction which would permit its rinsing, without taking the entire slide valve from the apparatus in which it is mounted.

Another object of the invention is a slide valve of the above-described type which would insure easy access to the rinsable parts which should be easily removable.

SUMMARY OF THE INVENTION

These and other objects of the invention, which will become apparent hereinafter, are achieved by providing a slide valve of the above-described type in which the housing has an annular surface, which surrounds the flow channel and is located adjacent to the seal ring, with the annular surface having a plurality of bores having axes extending parallel to the flow channel axis.

The seal ring has, on a side thereof remote from the slide plate, a plurality circumferentially arranged recesses spaced from each other and extending in a circumferential direction, with the recesses being outwardly limited by key hole-shaped openings, respectively, and being aligned, respectively, with the bore formed in the adjacent annular surface of the housing. The slide valve further includes a plurality of bolts displaceably arranged in the plurality of bores and having shaped heads extending into the plurality of recesses, respectively and engageable from behind by the key hole-shaped openings.

BRIEF DESCRIPTION OF THE DRAWINGS

The objects and features of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
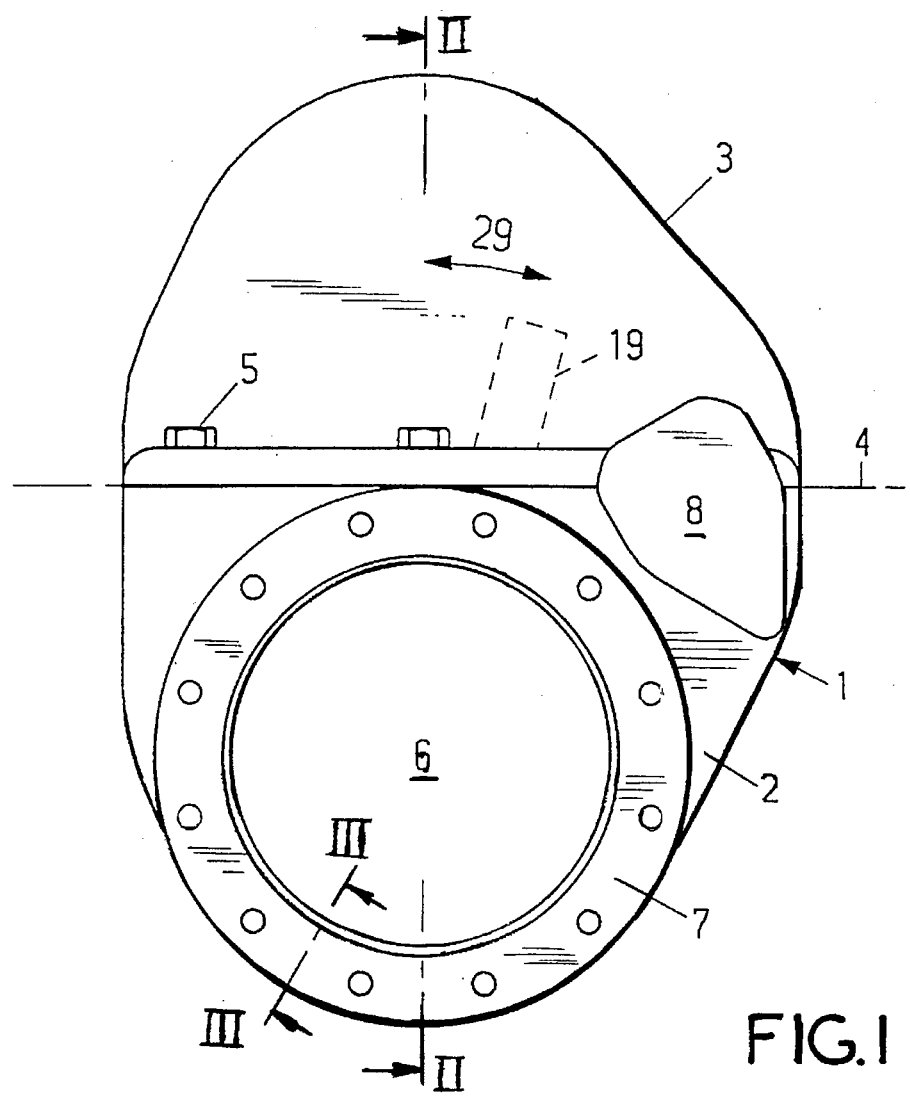
FIG. 1 is a plan view of a slide valve according to the present invention.
Figure 2:
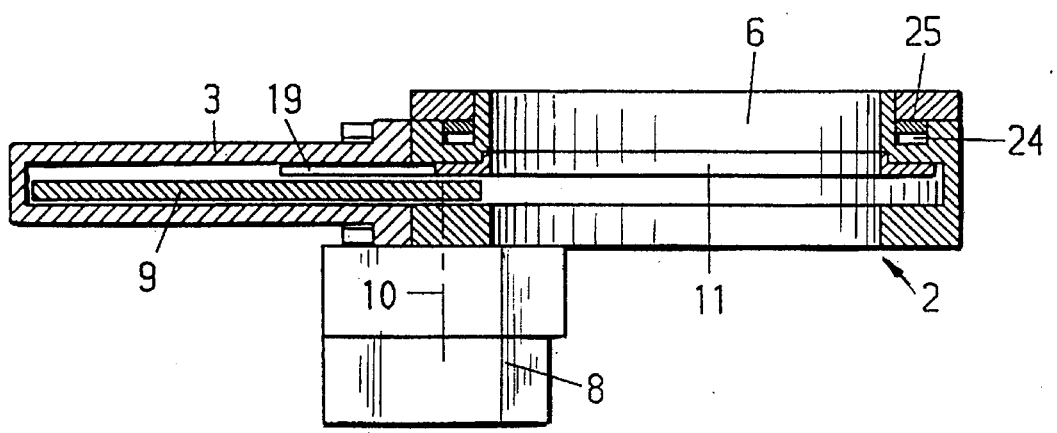
FIG. 2 is a schematic longitudinal cross-sectional view along line II—II in FIG. 1.

The slide valve shown in FIG. 1 includes a housing 1 formed of two housing parts 2 and 3 releasably connected along a separation plane 4 with, e.g., screws 5. The lower housing part 2 has a flow channel 6. The lower housing part is provided with a connection flange 7. A servomotor 8 for displacing the slide plate 9 is flange-mounted on the lower part 2. In the open position of the slide valve, the slide plate is located in the upper housing part 3 (FIG. 2). The slide valve shown in the drawings represents a so-called pendulum slide valve in which the slide plate 9 is displaced into its open position (FIG. 2) and into its closing position by pivoting about the axis 10.

A seal ring 11, which surrounds the flow channel 6, is provided in the lower housing part 2. The seal ring 11 is provided with a nipple 12 extending into the flow channel 6. The seal ring 11 support two o-rings 13 and 14 formed of an elastomeric material and located in respective grooves formed in the seal ring 11. One o-ring 13 abuts a surface 15 of the slide plate 9, which is adjacent to the seal ring 11. The other o-ring 14 is provided in the outer side of the nipple 12 and abuts the wall of the flow channel 6. Both o-rings 13 and 14 have approximately the same diameter so that the both o-rings 13 and 14 lie on the common cylindrical surface.

Figure 4:
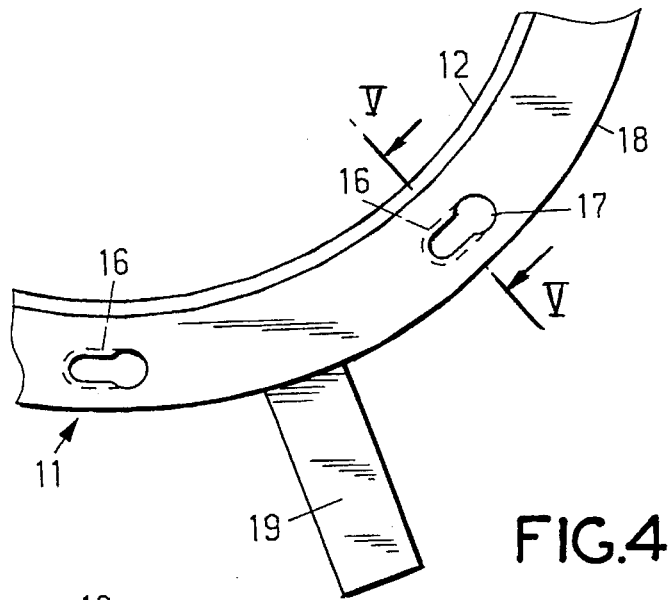
FIG. 4 is a plan view of a seal ring of a slide valve according to the present invention.
Figure 5:
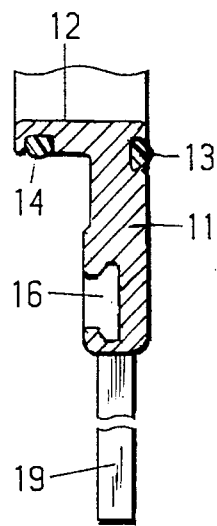
FIG. 5 is a cross-sectional view along line V—V in FIG. 4.

The seal ring 11 has on its side, remote from the slide plate 9, a plurality of circumferentially arranged one after another recesses 16 (FIG. 4), which are limited outwardly by key hole-shaped openings 17. Further, a sidewise extending handle 19 is provided on the outer edge 18 of the seal ring 11, which extends in the seal ring plane.

A plurality of bores 21 extends from a housing annular surface 20, which is adjacent to the seal ring 11 and surrounds the flow channel 6. Along the annular surface 20, there are provided as many bores 21 as there are recesses 16 on the seal ring 11, and the bores 21 are separated by the same pitch as the recesses 16. A plurality of bolts 22 are displaceably arranged in the bores 21. The bolts 22 are provided on end surface thereof with mushroom-shaped heads 23 which extends into the recesses 16 of the seal ring 11 and are form-lockingly engaged from behind by the key hole-shaped openings 17 (FIG. 3).

The bores 21 extend up to a annular chamber 24 which surrounds the flow channel 6. An annular piston 25 equipped with seals 26 is located in the channel 24. An inlet conduit 27 opens into the chamber 24 and is so arranged relative to the piston 25 that the fluid flowing therethrough acts only on one side of the piston 25. There are further provided a plurality of springs 28 which act on a side of the annular piston 25 remote from the bolts 22. The number of springs 28 corresponds to that of the bolts 22, and the springs 28 are respectively aligned with bolts 22.

The seal ring 11 is so arranged in the housing part 2 that its handle 19 projects beyond the separation plane 4 of the housing 1 and extends into the upper housing part 3 (FIG. 2).

Figure 3:
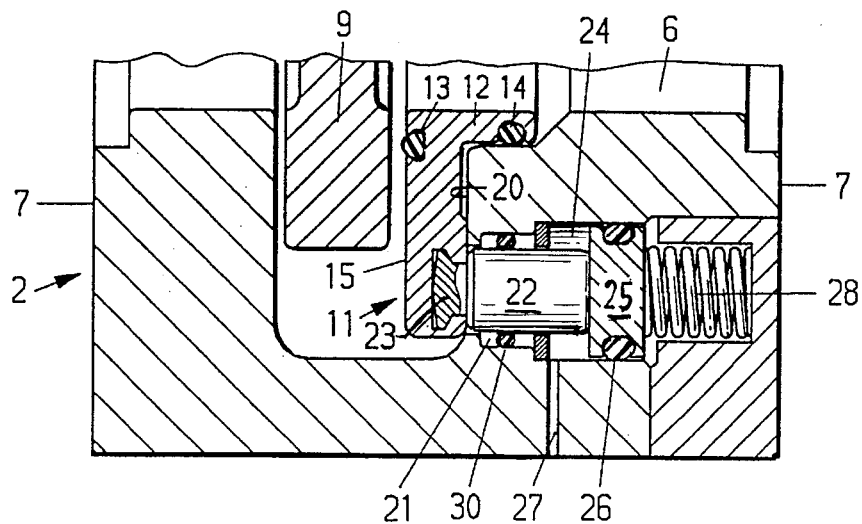
FIG. 3 is partial cross-sectional view at an increased scale along line III—III in FIG. 1.

When the slide valve is in its open position the slide plate 9 is located in the upper housing part 3 (FIG. 2), and the seal ring 11 occupies a position shown in FIG. 3. In this position of the seal ring 11, a pressure medium flows into the annular chamber 24 so that the annular piston 25 is displaced, against the biasing force of springs 28, rightwardly (FIG. 3), together with the bolts 22 which are operatively connected with the annular piston 24.

When the slide valve should be closed, the servomotor 8 is actuated, and it displaces the slide plate 9 into the channel 6 (FIG. 3). To seal the closed slide valve, the pressure fluid is evacuated from the annular chamber 24, so that the springs 28 push the annular piston 25, together with bolts 22 leftward. This causes displacement of the seal ring 11 leftward, and the o-ring 13 engages the slide plate.

The opening of the slide valve is effected in reverse. Pressure fluid is supplied into the annular chamber 24 so that the annular piston 25 moves together with the bolts 22 rightward, moving the seal ring 11 away from the slide plate 9, and the slide plate 9 is pivoted out.

For rinsing the slide valve, the screws 5 are released, and the upper housing part 3 is removed in case it is hingedly connected with the lower housing part, is pivoted sidewise. In this position, the slide plate 9 is easily accessible and can be easily removed, as it is releasably mounted on the shaft of the servomotor 8. After having been released, the slide plate 9 can be easily withdrawn.

To remove the seal ring 11, the fluid is evacuated from the annular chamber 24, so that the annular piston 25 and, together with it, the bolts 22 and the seal ring 11 move leftward. In this position, the handle 9, which projects above the separation plane 4, is pivoted slightly, in the direction of arrow 29, so that the formlocking connection between the recesses 16 and the mushroom-shaped heads 23 of the bolts 22 can be released. After the formlocking connection between the recesses 16 and the heads 23 of the bolts 22 is released, the seal ring 11 can be easily removed from the housing 1 and can be rinsed without any difficulties. The mounting of the seal ring 11 in the housing 1 is effected in the reverse order.

It is within the scope of the invention of provide two inlet conduits opening into the annular chamber so that fluid pressure would act on opposite sides of the annular piston 25, and to thereby eliminate springs 28. Further, instead of one o-ring 30, several such rings can be provided on the bolts 22. Instead of a mushroom shape head 23, a hammer-shaped head may be provided on bolts 22, with correspondingly shaping the head-receiving openings in the seal ring 11. However, in case the formlockingly engaged heads of the bolts 22 are rotationally symmetrical, measures should be undertaken to prevent rotation of the bolts 22 in the openings 21.

The invention is also applicable to a linear displaceable slide plate, i.e., the invention is not limited to the pendulum slide valves. With a linear displaceable slide plate, the value housing is also formed of two parts, with the separation plane of the housing being as closed to the flow channel as possible.

In case the slide valve should be heated, the slide plate is fixedly mounted on the servomotor shaft which is made hollow, with a cartridge type heater, which operates on a principle of resistance heating, being located inside the shaft.

Though the present invention was shown and described with reference to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claim is:

1. a slide valve, comprising:

a housing having a flow channel;

a slide plate located in the housing and displaceable transversely to a flow channel axis between a closed position, in which it blocks flow through the flow channel, and an open position, in which it provides for the flow through the flow channel; and a seal ring surrounding the flow channel and engaging the slide plate in the closed position thereof and disengageable from the slide plate in the open position thereof;

wherein the housing has an annular surface surrounding the flow channel and located adjacent to the seal ring, the annular surface having a plurality of bores having axes extending parallel to the flow channel axis, wherein the seal ring has, on a side thereof remote from the slide plate, a plurality of circumferentially arranged recesses spaced from each other and extending in a circumferential direction, the recesses being outwardly limited by key hole-shaped openings, respectively, and being aligned, respectively, with the bores formed in the adjacent annular surface of the housing, and wherein the slide valve further comprises a plurality of bolts displaceably arranged in the plurality of bores and having shaped heads extending into the plurality of recesses, respectively, and engageable from behind by respective key hole-shaped openings.

2. A slide valve asset forth in claim It wherein the shaped heads of the bolts have one of a bracket shape and a mushroom shape.

3. A slide valve as set forth in claim 1, wherein the housing has an annular chamber which surrounds the flow passage and into which the bores formed in the annular surface open, and wherein the slide valve further comprises an annular piston located in the annular chamber and operatively connected with the bolts, and at least one inlet conduit opening into the annular chamber for conducting fluid thereinto.

4. A slide valve as set forth in claim 3, wherein the slide valve comprises a plurality of springs acting on an end surface of the annular piston remote from the bolts.

5. A slide valve as set forth in claim 4, wherein a number of springs correspond to the number of bolts.

6. A slide valve as set forth in claim 5, wherein the springs are aligned with the bolts.

7. A slide valve as set forth in claim 1, wherein the seal ring has a nipple extending into the flow channel, a first annular groove provided in an end surface of the seal ring located adjacent to the slide plate, and a second annular groove provided in an outer surface of the nipple, and wherein the slide valve further comprises two o-rings located, respectively, in the first and second grooves, the o-ring located in the second groove engaging a flow channel wall.

8. A slide valve as set forth in claims 7, wherein both rings have substantially same diameter.

9. A slide valve as set forth in claim 1, wherein the seal ring has a sidewise extending handle lying in a plane of the seal ring.

10. A slide valve as set forth in claim 9, wherein the housing is formed of two parts separated by a separation plane, and wherein the handle extends beyond the separation plane.

11. A slide valve as set forth in claim 10, wherein the slide valve is formed as a pendulum slide valve, wherein the flow channel is formed in one of the two parts, and wherein the slide valve further comprises a servomotor for pivoting the slide plate between the closing and open positions, the servo-motor being and flange-mounted on the one of the two parts.

* * * * *